(12) United States Patent
Lee

(10) Patent No.: US 6,836,524 B1
(45) Date of Patent: Dec. 28, 2004

(54) PEDOMETER FOR DETECTING VIBRATIONS IN THE MOTION DIRECTION

(75) Inventor: Yo-Hong Lee, Taipei (TW)

(73) Assignee: Lico Electronic Corp., Taipei (TW)

(*) Notice: Subject to any disclaimer, the term of this patent is extended or adjusted under 35 U.S.C. 154(b) by 0 days.

(21) Appl. No.: 10/627,721

(22) Filed: Jul. 28, 2003

(51) Int. Cl.[7] .............................................. G01C 21/00
(52) U.S. Cl. .............................. 377/24.2; 482/8; 482/3; 482/74
(58) Field of Search .......................... 377/24.2; 482/8, 482/3, 74

(56) References Cited

U.S. PATENT DOCUMENTS 5,844,960 A * 12/1998 Sham et al. ................ 377/24.2
6,122,340 A * 9/2000 Darley et al. .............. 377/24.2
6,717,809 B2 * 4/2004 Chen et al. ................ 361/695

FOREIGN PATENT DOCUMENTS

JP 2003156508 A * 5/2003 ........... G01P/15/09

* cited by examiner

Primary Examiner—Margaret R. Wambach
(74) Attorney, Agent, or Firm—Rabin & Berdo, P.C.

(57) ABSTRACT

A pedometer for detecting vibrations in a direction of motion is disclosed. The architecture of the device includes a main body, a vibration detector, and a counting circuit. The counting circuit is connected to the vibration detector and the counting circuit and vibration detector are installed inside the main body. Since the vibration detector is disposed orthogonal to the direction of motion, the vibration detector is able to detect the smallest vibration in the direction of motion and outputs a pulse signal to the counting circuit. The counting circuit includes a signal amplifier circuit, a signal detection circuit, and a processor. This pedometer is capable of picking up weak vibration signals to take an accurate count of the jogger's pace.

9 Claims, 7 Drawing Sheets

PEDOMETER FOR DETECTING VIBRATIONS IN THE MOTION DIRECTION

BACKGROUND OF THE INVENTION

1. Field of the Invention

The present invention relates to a pedometer for detecting vibrations in the stepping direction, in particular to a pedometer that can directly detect vibrations of a jogger's body with a detector positioned orthogonal to the moving direction.

2. Description of Related Arts

Figure 7:
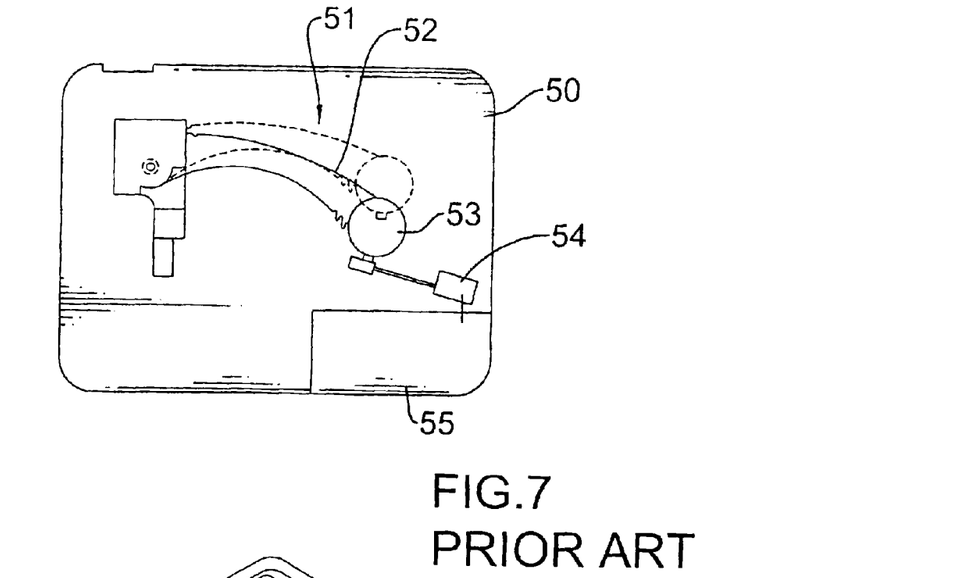
FIG. 7 is a structural diagram of the mechanical pedometer.

Pace counting devices can be classified into mechanical and electronic types. With reference to FIG. 7, the structure of a mechanical type pedometer includes a shell (50), a swing arm (51) being installed inside the shell (50) for normal operation in the upright position, a spring (52) and a weight (53) being attached to the end of the swing arm (51), an electronic switch (54) being disposed to correspond with the position of the weight (53); and a counting circuit (55) being connected to the electronic switch (54).

When in motion, the jogger's feet pound the ground exerting a downward force. Since the swing arm (51) is positioned perpendicular to the horizontal plane, the downward force will pull down the weight (53) to touch the electronic switch (54), thus the electronic switch (54) is toggled by the footsteps. The counting circuit (55) thereafter detects the status change in the electronic switch (54), and then increases the count by one. Therefore, the pace count will continue until when the jogger stops moving. The counting circuit (55) working in conjunction with the electronic switch (54) and the swing arm (51) records the actual footsteps of the jogger. However, this kind of mechanical pedometer is known to have weaknesses, such as too much noise disturbance, oxidation of the contact points, and metal exhaustion of the spring. In addition, since the device is inherently designed for upright mounting, only directly downward vibrations can toggle the electronic switch (54) in the counter to produce the pace count, whereby false readings may occur if the vibration is oblique to the switch. Such false readings will be very confusing and probably infuriating to the jogger as obviously such a person has a particular interest in knowing the precise distance traveled.

Figure 8:
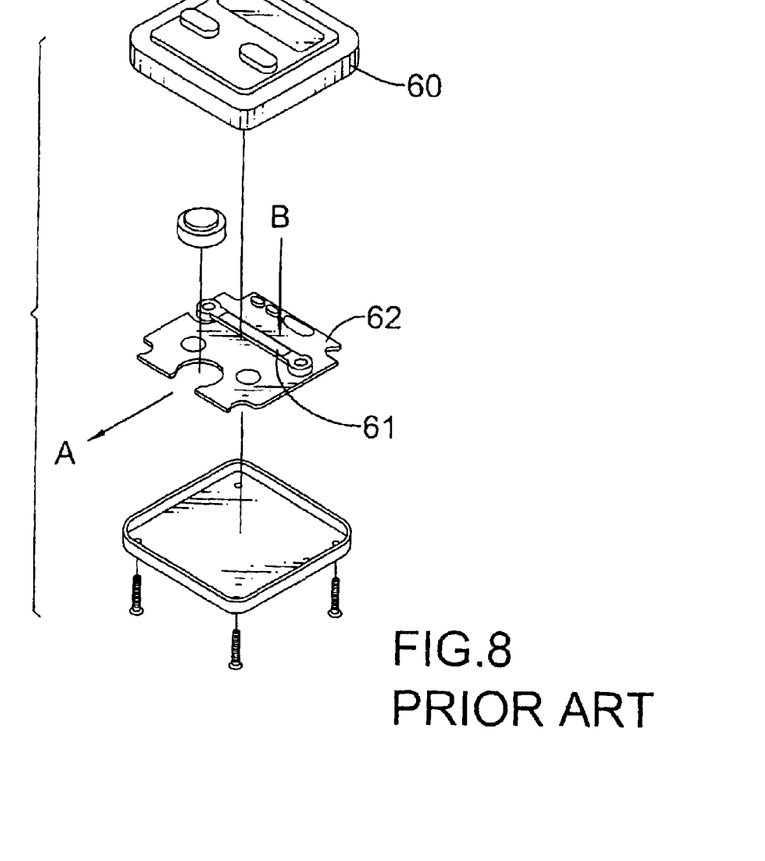
FIG. 8 is a structural diagram of an electronic pedometer.

In order to overcome the weaknesses mentioned above, electronic pedometers having higher precision have recently been developed. The physical structure of a typical electronic type pedometer is illustrated in FIG. 8, including a shell (60), a ceramic piezoelectric component (61) being installed laterally inside the shell (60), and a counting circuit (62) being connected to the ceramic piezoelectric component (61).

The above ceramic piezoelectric component (61) detects substantial downward force generated by walking, jogging etc, and converts the downward force into a signal output to the counting circuit (62) for pace counting.

The use of the ceramic piezoelectric component (61) to detect downward vibration can eliminate the problems associated with the swing arm (51) in a mechanical pedometer. Since the ceramic piezoelectric component (61) is designed to detect downward force exerted by motion, the counting circuit (62) has to be mounted laterally inside the counter shell (50) which is secured onto the jogger in order to take the pace count with accuracy.

Some manufacturers have tried to increase the length of ceramic piezoelectric component (61) to increase the efficiency of the pedometer, while keeping the slim shape of a portable pedometer. Others have tried to increase the payload to increase the sensitivity of the pedometer, but this kind of modification also magnifies after shocks following each foot step, which often causes the counting circuit to pick up after shock signals resulting in counting errors.

From the above discussion of these two types of pedometers, it is apparent that the conventional vibration detector has to rely on more substantial downward force generated by footsteps to maintain an accurate counting. Furthermore, the jogger has to preset the direction parameter of the counting device telling the counting device which direction the jogger is going to take; otherwise, some of the counting devices may record incorrect pace counts. To correct this problem, some manufacturers of pedometers have come up with new pedometers claiming that the new counters do not need presetting of the stepping direction, and the size of these counters is small enough to be carried along in a pocket. However, in reality, if the stepping direction is not preset, the pace counting by these portable devices is not very reliable.

To satisfy the need for a direction-less pedometer, the pedometer has to use two vibration detectors orthogonally disposed to each other to detect vibrations from every direction, such that the counter can be rotated angles without affecting the operation results. Looking at the current market situation, pedometers with such capabilities usually have a large physical size and are relatively expensive.

SUMMARY OF THE INVENTION

The main object of the present invention is to provide a pedometer that can detect body vibrations in the motion direction, and can still be operated accurately after changing the counter position.

Such a pedometer is fully portable and uses a single detector for detecting body vibration. Other advantages of the new pedometer are that it can directly detect body vibrations in the direction of motion, and the new counter is less affected by after shocks as compared with conventional pedometers. Using a piezoelectric element, the new pedometer is able to directly detect body vibrations in the motion direction with good accuracy.

To this end, the physical structure of the pedometer comprises:

a main body;

a vibration detector being laterally installed inside the main body; and a counting circuit also being laterally installed inside the main body, which is formed by a signal amplifier circuit and a signal detection circuit.

The present invention is characterized in that the pedometer having an orthogonal vibration detector is able to detect body vibrations generated by a jogger in the direction of motion. Furthermore, the new pedometer has a signal amplifier circuit built in for amplifying weak vibration signals in a certain direction if the vibration detector is moved to a different position other than the orthogonal position.

The present invention is also characterized in that a single vibration detector is used in the pedometer. With proper positioning of the vibration detector orthogonal to the direction of motion and the sophisticated control logic in the counting circuit, the new pedometer is able to take accurate count of the jogger's pace without having to use two orthogonal vibration counters.

The features and structure of the present invention will be more clearly understood when taken in conjunction with the accompanying drawings.

DETAILED DESCRIPTION OF THE PREFERRED EMBODIMENT

Figure 1:
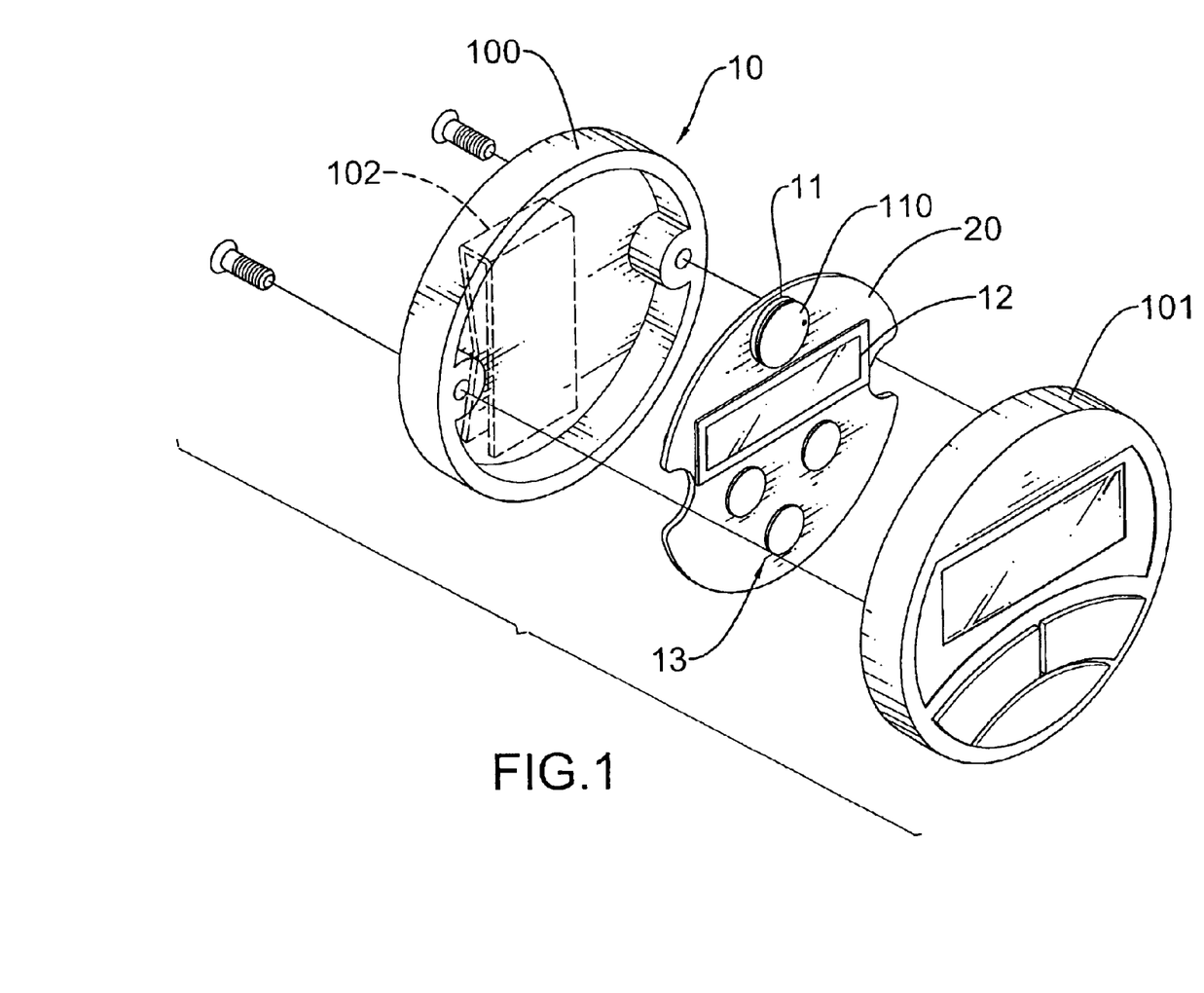
FIG. 1 is an exploded diagram of the architecture of the pedometer in accordance with the present invention.

The present invention provides a pedometer for detecting vibrations in the direction of motion, which is able to detect body vibrations in the direction of motion. In FIG. 1, the basic structure of the new pedometer comprises a main body (10), a printed circuit board (20), and a counting circuit (30) (not shown in the diagram). The main body (1l) consists of a shell base (100) and an outer shell (101), wherein the back end of the shell base (100) has a clip (102) attached thereto for securing the pedometer on the jogger's body.

Figure 5:
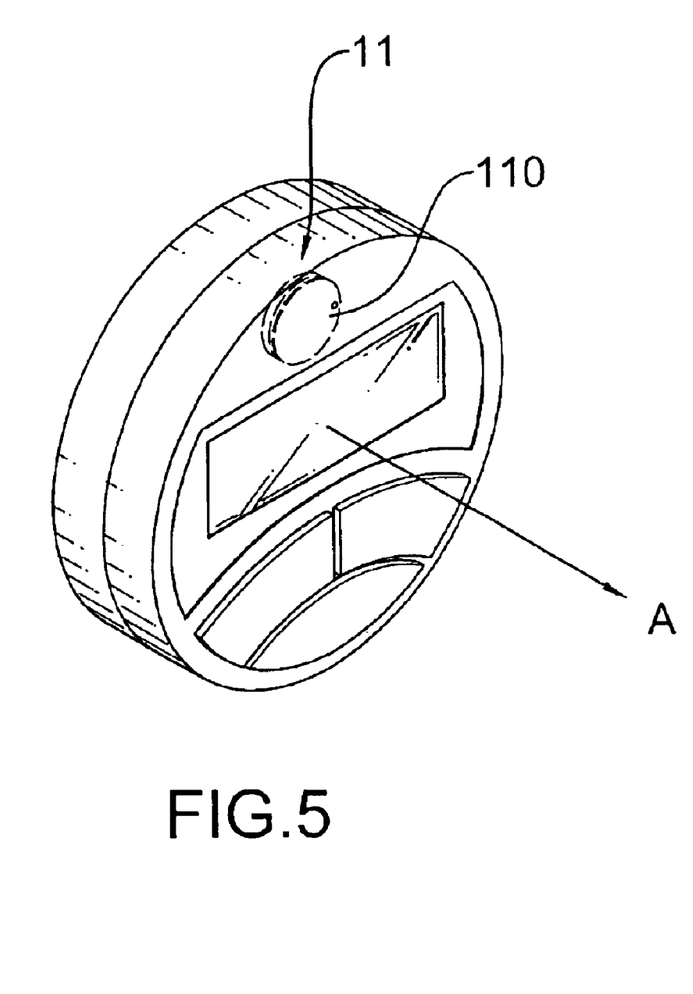
FIG. 5 is a perspective diagram of the pedometer.

The printed circuit board (20) is installed laterally over the shell base (100) and has a counting circuit (30) (not shown in the diagram) embedded therein. A vibration detector (11) is fixed on the printed circuit board (20) and connected to the counting circuit (30), and a sensing pad (110) linking to the vibration detector (11) is placed perpendicular to the horizontal plane for sensing the motion vibrations in the motion direction A as shown in FIG. 5. In other words, a direction that the vibration detector (11) possesses the best sensitivity is the same as a moving direction of the jogger.

The vibration detector (11) is formed as a circular or rectangular ceramic piezoelectric element. Referring to FIGS. 1, 2, 3, and 5, a display unit (12) is installed on the printed circuit board (20) and connected to the counting circuit (30) for displaying a pace count value. An optional key pad (13) is placed on the printed circuit board (20) and connected to the counting circuit (30).

Figure 2:
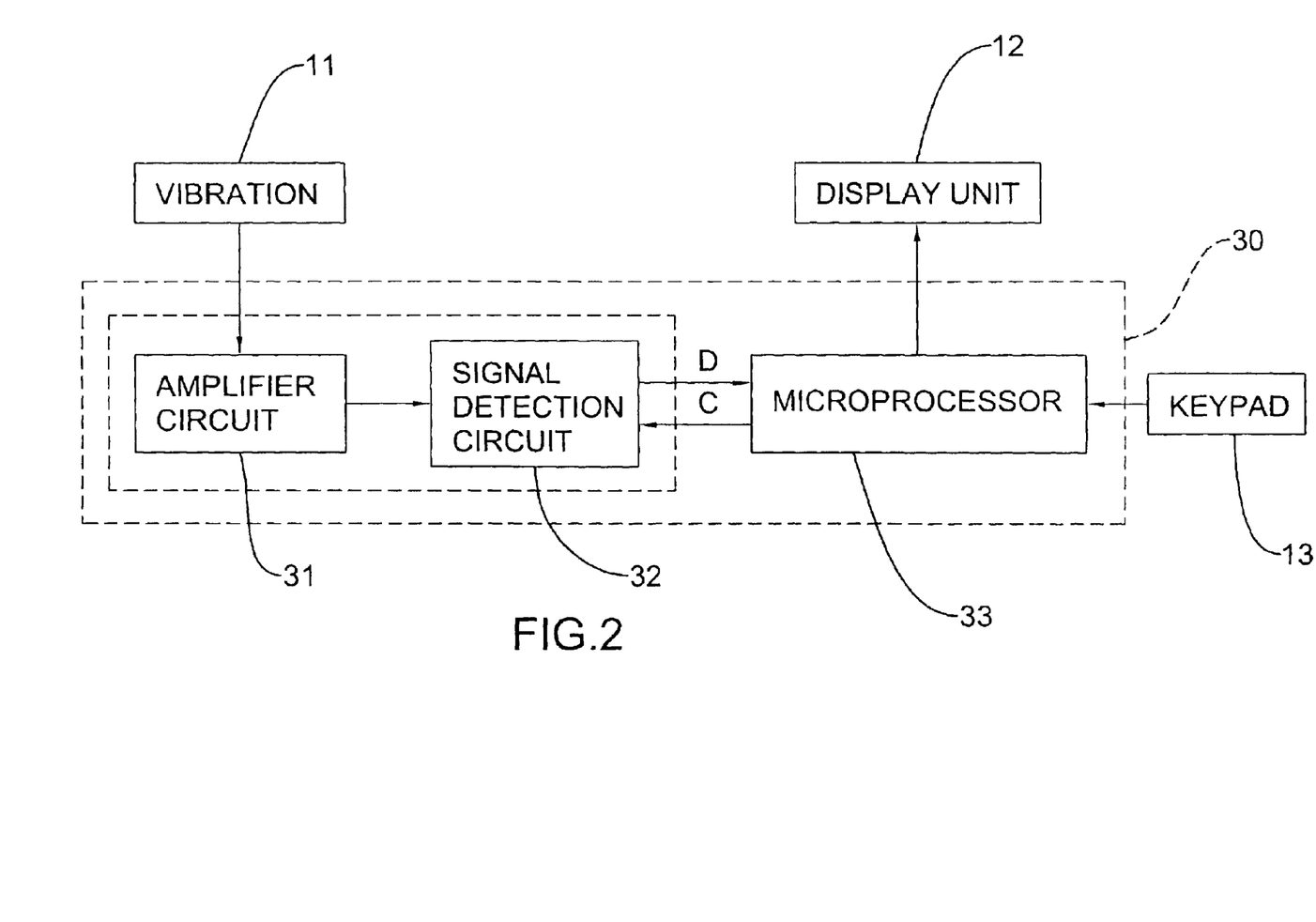
FIG. 2 is a block diagram of the control circuitry in the new pedometer.

The counting circuit (30), as shown in FIG. 2, includes a signal amplifier circuit (31), a signal detection circuit (32), and a processor (33).

Figure 3:
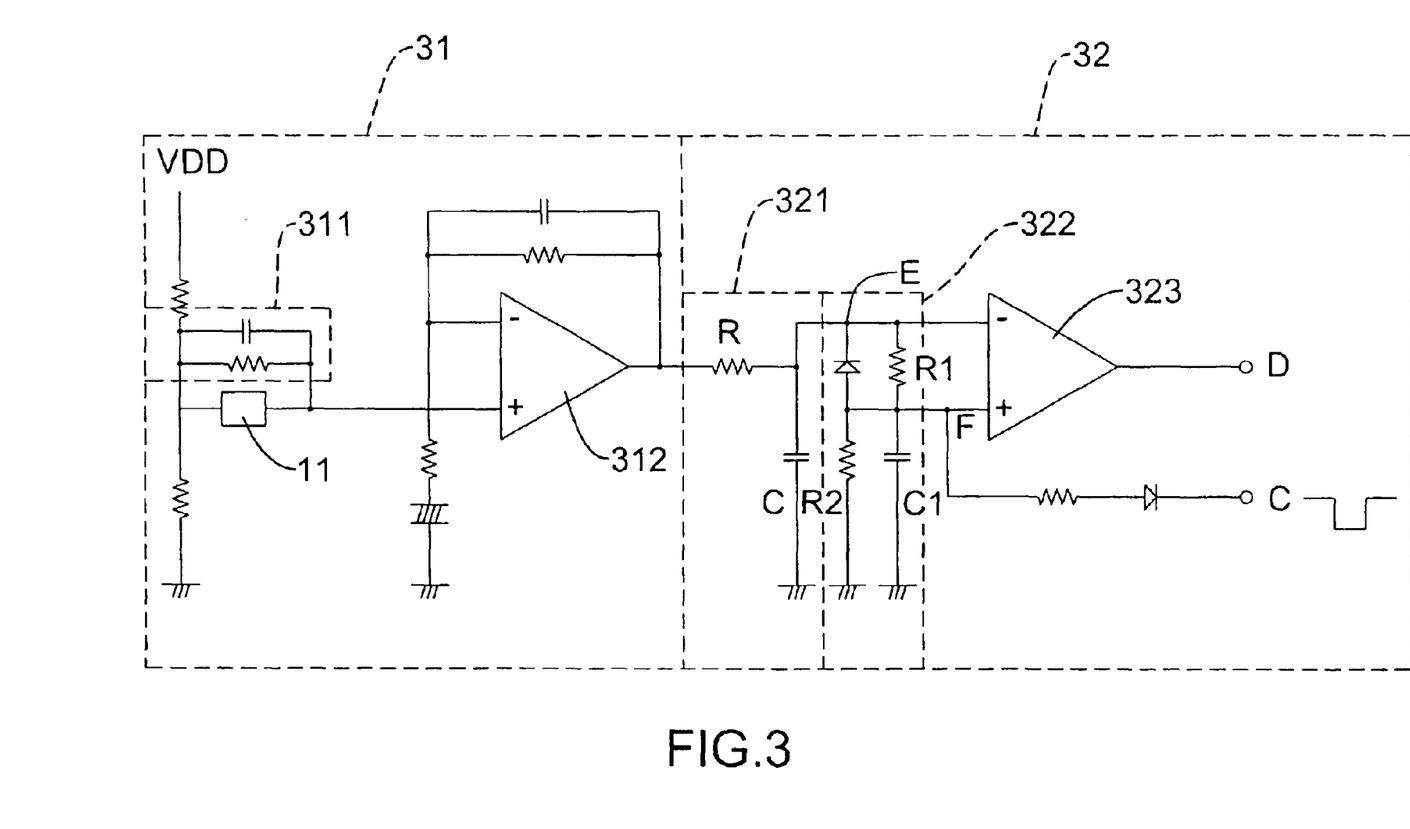
FIG. 3 is a partial schematic diagram of the control circuitry.

The signal amplifier circuit (31) is connected to the output of the vibration detector (11). The vibration detection signals are passed through a filter (311) and a signal amplifier (312), wherein an input of the filter (311) is connected to the vibration detector (11), while an output of the filter (311) is connected to the input of the signal amplifier (312).

A signal detection circuit (32) is connected to the output of signal amplifier circuit (31) for sensing vibration signals output by the signal amplifier circuit (31). The signal detection circuit (32) is formed by a low-pass filter (321), a voltage divider (322) and a comparator (323), wherein the voltage divider (322) is formed by two series connected resistors (R1, R2), and a grounded capacitor (C1), such that the low-pass filter (321) is connected to a positive input E of the comparator (323) and the voltage divider (322) is connected to a positive input F of the comparator 323.

The input of the processor (33) is connected to the output D of the comparator (323) in the signal detection circuit (32), while the output of the processor (33) is connected to the positive input F (reference voltage terminal) of the comparator (323), and the processor (33) is connected to the display unit (12) and the optional key pad (13).

The structure and the design of the new pedometer have been described above. The method of operating the new pedometer is explained below.

Figure 4:
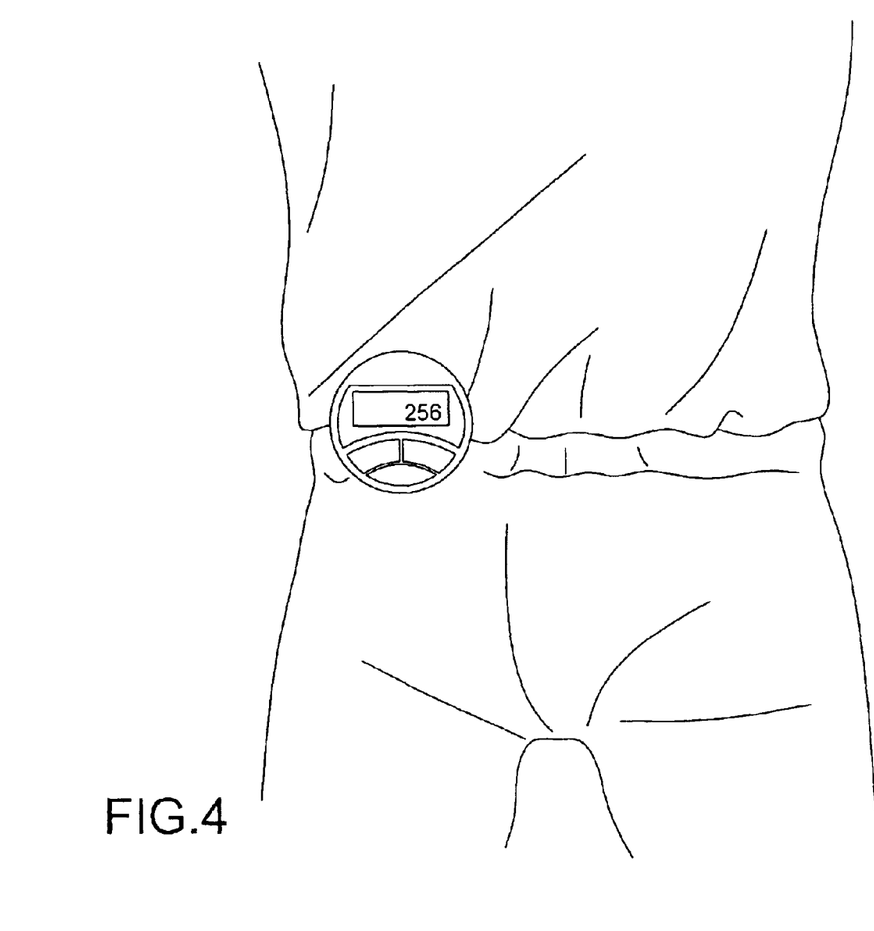
FIG. 4 is a conceptual diagram of the mounting of the pedometer on the waistband of a jogger.

With reference to FIGS. 4 and 5, the clip (102) (not shown in the diagram) is attached to the back of the shell base (100). The clip (102) allows the pedometer to be securely attached onto the waistband of the jogger, such that the sensing pad (110) of the vibration detector (11) is disposed orthogonal to the motion direction of the jogger. When the jogger starts to walk or run, the vibration detector (11) is able to detect the smallest amount of body vibration in the motion direction A and then outputs a vibration detection signal to the counting circuit (30) for cumulative counting.

The circuit actions of the counting circuit (30) are explained in reference to FIGS. 2 and 3. When the vibration detector (11) outputs a weak vibration detection signal to the signal amplifier circuit (31) due to the positioning of the counter, the signal is first passed through the filter (311) for filtering out any high frequency noise, and then the signal is fed through the signal amplifier (312) for signal amplification. The amplified signal is then output to the signal detection circuit (32), wherein the signal first passes through a low-pass filter (321) to the negative input E of the comparator (323). At the same time, the amplified signal is branched through the voltage divider (322) to the positive input F (reference voltage) of the comparator (323).

When the vibration detector (11) does not output vibration detection signals, the signal amplifier (312) outputs a signal with positive potential to the signal detection circuit (32). Since the signal input to the positive input F (reference voltage) is fed through the voltage divider (322), the resultant voltage is less than the voltage on the negative input E, thus the comparator outputs a signal with positive potential.

Figure 6A:
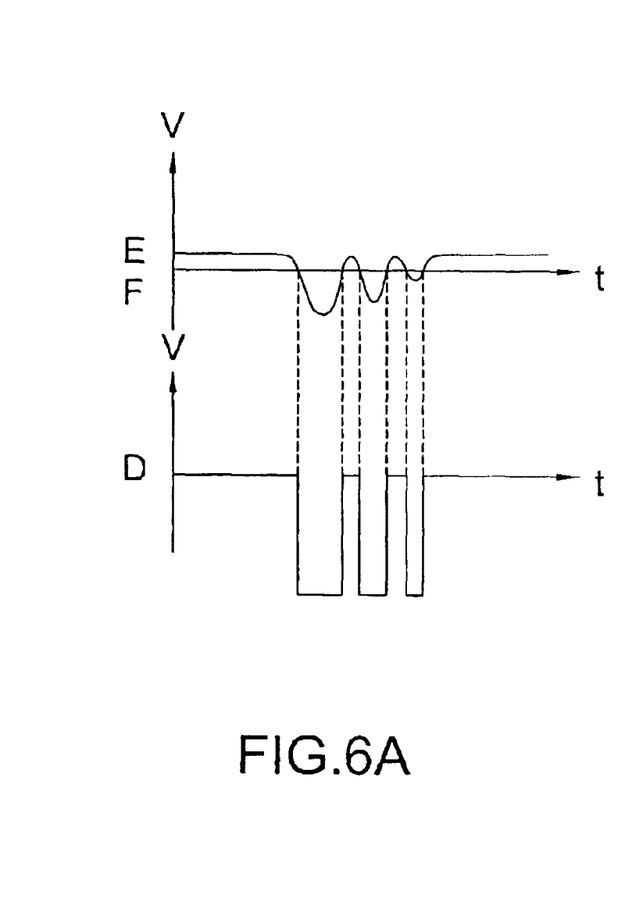
FIGS. 6A, 6B are waveform diagrams of the output vibration signals.

With reference to FIG. 6A, the amplified vibration detection signal from the vibration detector (11) to the signal detection circuit (32) charges the capacitor C1 in the voltage divider (322), which causes the rate of voltage increase on the negative positive input F (reference voltage) of the comparator (323) to be slower than that on the positive negative input E. Therefore, when a surge signal with negative potential appears on the vibration detection signal line, the voltage on the negative input E is higher than that on the positive input F (reference voltage) due to the delay effect of the capacitor C1. Therefore, the comparator (323) outputs a signal with negative potential from output D to the processor (33) once a surge signal appears, indicating that the vibration detection signal has successfully detected the surge signal. Since the amplified vibration detection signal may carry after signals, which may cause false output by the comparator (323), the vibration signal has to pass through a filter.

Figure 6B:
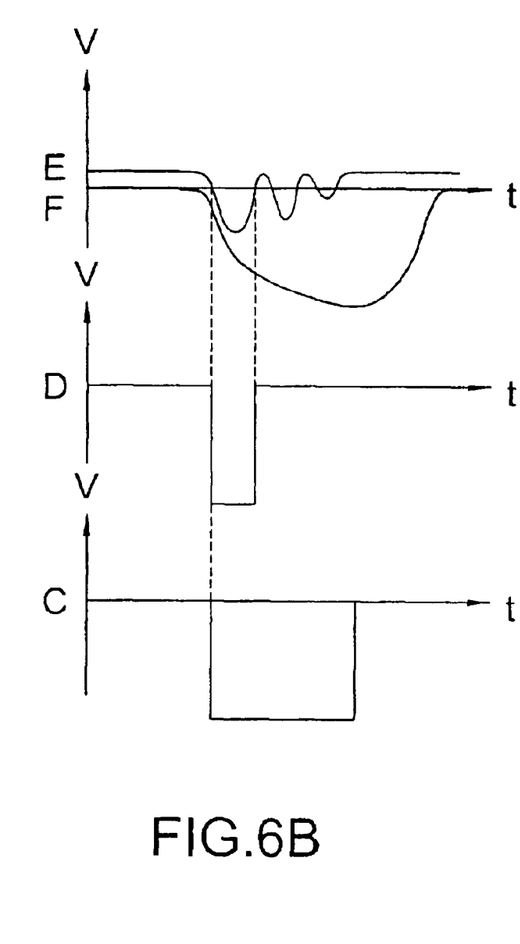

With reference to FIG. 6B, when the processor (33) receives the surge signal from the comparator (323), the processor (33) outputs a pulse signal to the negative positive input F (reference voltage) to cause the previously charged capacitor C1 to discharge. Since the amplitude of after signals is usually small, the signal output of the processor (33) can be appropriately tuned to carry an amplitude slightly greater than after signals, such that the comparator (323) will not react to after signals.

Using the preferred embodiment for the illustration, when the pedometer is set to the rate of four steps in every second, then the pulse width of the output signal from the processor (33) is 250 ms. Through the capacitor C1, the voltage on the reference voltage terminal increases smoothly. Since the sensitivity level is set, any vibration with a rate greater than the preset level can not be real and thus is disregarded. Using the control input C to the reference voltage terminal, the sensitivity level of the comparator (323) can be tuned to the desired level for removing after signals.

In summary, the present invention has several advantages over the conventional pedometers in that a single vibration detector is used to detect the smallest body vibration in the stepping direction and filter out unwanted after signals even if the pedometer is not disposed in a position not perfectly along to the belt.

The foregoing description of the preferred embodiments of the present invention is intended to be illustrative only and, under no circumstances, should the scope of the present invention be so restricted.

What is claimed is:

1. A pedometer for detecting vibrations in a direction of motion, comprising:
   a main body (10);
   a printed circuit board (20) incorporating a counting circuit (30) and being installed inside the main body (10);
   the counting circuit (30) being formed by a signal amplifier (31), a signal detection circuit (32), and a processor (33);
   a vibration detector (11) being installed on the printed circuit board (20) and connected to the counting circuit (30), wherein a sensing pad (110) of the vibration detector (11) is disposed orthogonal to the direction of motion to sense any body vibration in the direction of motion;
   wherein the vibration detector (11) comprises a ceramic piezoelectric element; and
   a display unit (12) being installed on the printed circuit board (20) and connected to the counting circuit (30) for displaying a pace count value;
   where the above vibration detector (11) is disposed orthogonal to the direction of motion and operates in conjunction with the counting circuit (30) on the printed circuit board (20) to detect any body vibration in the direction of motion.

2. A pedometer for detecting vibrations in a direction of motion, comprising:
   a main body (10),
   a printed circuit board (20) incorporating a counting circuit (30) and being installed inside the main body (10);
   the counting circuit (30) being formed by a signal amplifier circuit (31), a signal detection circuit (32), and a processor (33);
   a vibration detector (11) being installed on the printed circuit board (20) and connected to the counting circuit (30), wherein a sensing pad (110) of the vibration detector (11) is disposed orthogonal to the direction of motion to sense any body vibration in the direction of motion;
   wherein the counting circuit (30) includes:
      the signal amplifier circuit (31) being connected to an output of the vibration detector (11) to obtain a vibration detection signal from the vibration detector (11) after proper signal filtering and amplification;
      the signal detection circuit (32) being connected to an output of the signal amplifier circuit (31) to compare the vibration detection signal with a variable reference voltage and then output a pulse signal; and
      the processor (33) being connected to the signal detection circuit (32) to provide the reference voltage and receive the pulse signal output from the signal detection circuit (32); and
   a display unit (12) being installed on the printed circuit board (20) and connected to the counting circuit (30) for displaying a pace count value;
   where the above vibration detector (11) is disposed orthogonal to the direction of motion and operates in conjunction with the counting circuit (30) on the printed circuit board (20) to detect any body vibration in the direction of motion.

3. The pedometer as claimed in claim 2, wherein the signal detection circuit (32) is formed by a low-pass filter (321), a voltage divider (322) and a signal comparator (323) having a negative input and a positive input, wherein the voltage divider (322) and the low-pass filter (321) respectively connected to the negative input and the positive input of the comparator (323).

4. The pedometer as claimed in claim 3, wherein the positive input of the comparator (323) is connected to an output of the processor (33), wherein the processor (33) uses a pulse signal input to control the comparator (323), whereby the processor (33) outputs a signal with a predetermined duration to reduce noises.

5. The pedometer as claimed in claim 3, wherein the voltage divider (322) is formed by two series connected resistors and a grounded capacitor.

6. The pedometer as claimed in claim 2, wherein the signal amplifier circuit (31) is formed by a filter (311) and a signal amplifier (312), such that an input of the filter (311) is connected to the vibration detector (11) and an output is connected to the signal amplifier (312).

7. The pedometer as claimed in claim 3, wherein the signal amplifier circuit (31) is formed by a filter (311) and a signal amplifier (312), such that an input of filter (311) is connected to the vibration detector (11) and an output is connected to the signal amplifier (312).

8. The pedometer as claimed in claim 4, wherein the signal amplifier circuit (31) is formed by a filter (311) and a signal amplifier (312), such that an input of filter (311) is connected to the vibration detector (11) and an output is connected to the signal amplifier (312).

9. The pedometer as claimed in claim 5, wherein the signal amplifier circuit (31) is formed by a filter (311) and a signal amplifier (312), such that an input of filter (311) is connected to the vibration detector (11) and an output is connected to the signal amplifier (312).

* * * * *